April 6, 1965 N. S. TZANNES ETAL 3,177,450
TORSIONALLY VIBRATING DELAY LINE TRANSDUCERS
Filed May 7, 1962

INVENTORS
NICOLAOS S. TZANNES
PAUL E. BAKEMAN JR.

BY *Leo J. Aubel*
ATTORNEY

United States Patent Office 3,177,450
Patented Apr. 6, 1965

3,177,450
TORSIONALLY VIBRATING DELAY LINE TRANSDUCERS
Nicolaos S. Tzannes, Apalachin, and Paul E. Bakeman, Jr., Pittsford, N.Y., assignors to International Business Machines Corporation, New York, N.Y., a corporation of New York
Filed May 7, 1962, Ser. No. 192,894
2 Claims. (Cl. 333—30)

This invention relates to delay lines and more particularly to delay line transducers for converting electrical pulse energy to an acoustical stress wave or for converting an acoustical stress wave to an electrical pulse energy.

The magnetostrictive phenomena, i.e., the fact that certain materials when subjected to an electromotive force will contract or expand, is well known in the art. This principle is utilized in this invention.

In electro-acoustical delay lines, the period of delay is determined by the time required for the travel of an acoustical pulse, that is, a stress wave, from one end to the other of a length of a material usually in the form of a wire. The electrical pulse which is to be delayed is coupled by a transducer to one end of the length of the wire to cause an acoustical pulse or stress wave to be generated; and, another transducer is disposed at a point along the line for converting the acoustical pulse into an electrical pulse. The time delay between the input and output electrical pulses is determined primarily by the length of the delay line; the quality, i.e., the amount of distortion or dispersion, signal to noise ratio, etc. to the output pulse is determined by the input and output transducers as well as by the characteristics of the line.

Several types of transducers for converting electrical signals to acoustical stress waves are known in the art. The present invention improves on that type of transducer in which electrical signals developed on associated windings are converted to longitudinal stress waves on elongated strips; the strips are connected to a delay line and convert the longitudinal stress waves to torsional stress waves on the delay line. The conversion is bi-directional; i.e., torsional stress waves developed in the delay line are converted to longitudinal stress waves on the strips and thence to electrical pulse on the associated windings.

Since the maintenance of the pulse shape is of the first order of importance in delay line operation, it is essential that the input transducer provide a sharp, strong pulse to the delay line. A problem heretofore encountered in delay lines has been the small signal to noise ratios heretofore obtained. By providing a stronger input excitation to the delay line, a higher amplitude and a sharper pulse may be provided at the output end of the delay lines.

Accordingly, it is a principal object of the present invention to provide an improved transducer for coupling an electrical pulse to a delay line.

It is another object of the present invention to provide an improved transducer for converting an electrical pulse to a torsional stress wave or acoustical pulse.

It is another object of the present invention to provide a transducer for converting an electrical pulse to a longitudinal stress wave on a pair of magnetostrictive strips which strips are then attached to a delay line for coupling a torsional stress wave thereto.

It is another object of the present invention to provide an improved transducer in which the interaction of an electrical pulse and a flux field provided to the input and output strips couple a higher energization to and from the delay line.

It is still another object of the present invention to provide a transducer in which the flux fields provided are relatively constant.

It is yet another object of the present invention to provide an improved transducer delay line which is not temperature sensitive.

It is another object of the present invention to provide transducers arranged to have an improved geometrical relation between the flux field and the associated input and output strips.

In the attainment of the foregoing objects and in a preferred embodiment of the invention, there is provided a transducer including a pair of magnetostrictive strips attached to spaced points on the circumference of a delay line. Coil means are wound around the two strips and means are provided to develop a flux field which is guided through the magnetostrictive strips in the area around which the coil is wound. A disturbance of the flux field effects a contraction of one strip and an expansion of the other strip to thereby couple a torsional stress wave to the delay line. A similar transducer is provided for the other end or output of the delay line; the torsional energization of the delay line causes one of the output strips to expand and the other to contract thereby disturbing the flux field of said output transducer to cause an electrical signal to be developed on the output transducer coil.

The foregoing and other objects, features and advantages of the invention will be apparent from the following more particular description of preferred embodiments of the invention, as illustrated in the accompanying drawings.

Figure 1:
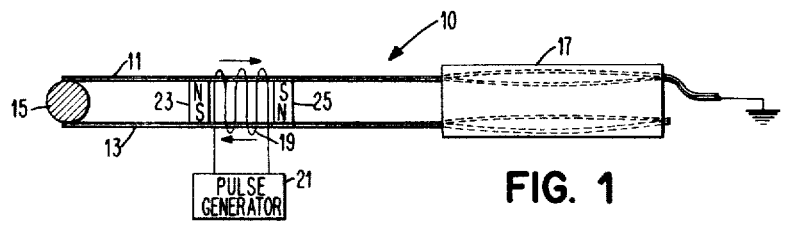
FIG. 1 is a schematic showing of an embodiment of a transducer according to the invention.

Referring to FIG. 1, a transducer 10 according to the invention includes a pair of magnetostrictive strips 11 and 13 which strips are formed of a plurality of laminations. One end of each of the strips 11 and 13 is connected as by welding to delay line 15; the strips are welded to diametrically opposed points on the periphery of the line 15. Strips 11 and 13 are embedded in a vibration damping substance 17 of any suitable known type, the end of one of the strips opposite the welds being connected to an electrical ground reference for purposes of eliminating noise. The substance 17 dampens the vibration of the magnetostrictive strips 11 and 13 for purposes of eliminating reflected stress waves. A coil or winding 19 is wound around both strips 11 and 13 and couples to external circuitry. When the transducer is used as an input coupling element to a delay line, the coil 19 is coupled to a pulse generator 21 of any suitable known type; when the transducer is used as an output element, the coil 19 is coupled to an amplifier 22 (see FIG. 2) of any suitable known type. Coil 19, when used as an input coil is energizable by the pulse generator to develop an alternating current, signal or control flux field to strips 11 and 13 as will be discussed hereinbelow.

A pair of permanent magnets 23 and 25 are mounted between the magnetostrictive strips 11 and 13. Magnets 23 and 25 are positioned to straddle coil 19 and are poled such as to cause a flux field to be developed having lines of force with a path extending from one magnet, say 23, through a portion of the strip 11, through the other magnet 25, the other strip 13 and back to the magnet 23; i.e., the magnets are connected in essentially a series flux circuit path including portions of strips 11 and 13, as indicated by the arrows. Because the flux field provided by the two magnets forms a closed loop, the magnetic loss is almost zero and the permanent magnets will last for a long period of time, i.e., almost indefinitely. The flux field provided by permanent magnets 23 and 25 can be considered as a direct current field or a biasing field, with a closed continuous loop.

In contrast to the structure of FIG. 1, permanent magnets which develop flux fields having lines of force which traverse air experience large losses and therefore such magnets deteriorate rather rapidly. Also, in the transduces of the prior art in which two coils are used, one coil being wound around each of the strips 11 and 13, the positioning of the coils relative to their respective distances from the weld point at the delay line to the edge of the coil is critical. Care must be taken that these distances are equal. In the transducer of FIG. 1, since only one coil is used, this problem is eliminated.

It has been found that it is preferable to mount magnets 23 and 25 relatively close to one another; in one embodiment the magnets were spaced approximately .070" from one another. In the same embodiment, the coil consisted of turns of wires and then strips 11 and 13 were approximately .020" distance apart.

Figure 6:
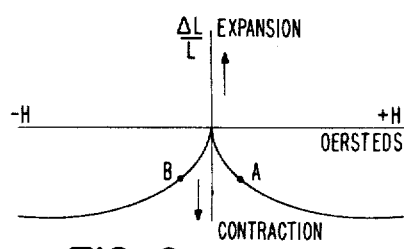
FIG. 6 is a curve useful in explaining the operation of the structure of the invention.

FIG. 6 is a curve showing the relative expansion characteristics of magnetostrictive strips 11 and 13. The relative expansion is indicated by the symbols $$\frac{\Delta L}{L}$$

and the flux field strength is indicated in oersteds (H). The biasing point of one strip is indicated as A and the biasing point of the other strip is indicated as B. The two biasing points are indicated as being on different curves because as noted above, the flux field is in a first direction through strip 11 and in a relatively opposite direction through strip 13. When the signal or control pulse is applied to the coil 19, the effective flux direction provided by coil 19 is in a relatively same direction through both strips 11 and 13. Thus, in one case, the control field provided by coil 19 will aid the direct current flux field provided by magnets 23 and 25 in one strip; but, the same control field will oppose the direct current flux field in the other strip. Thus, one of the strips will expand because of the increase in flux field strength affecting said strip; while the other strip will contract because of the decrease in flux field strength affecting it, i.e., a change in dimension occurs in the strips.

Figure 2:
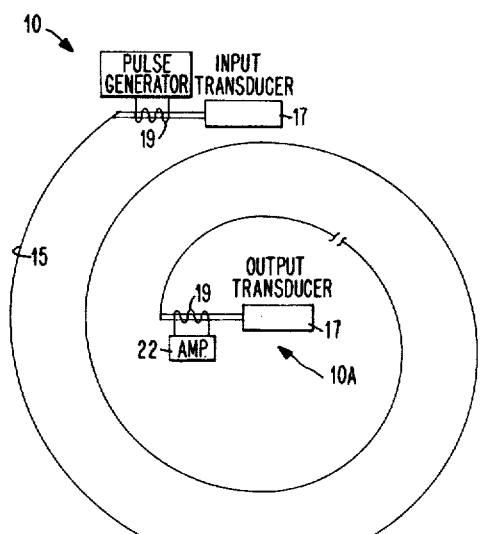
FIG. 2 is a schematic showing of a pair of transducers connected to a delay line in accordance with the invention.

FIG. 2 shows a pair of similar transducers connected to a delay line. One transducer 10 is employed as an input transducer which converts input electrical signals to torsional stress waves in the delay line 15. The torsional stress waves are propagated through line 15; and, after traversing through the length of the line, the torsional stress waves are coupled to the output transducer 10A (transducer 10A is identical to transducer 10) which converts the stress waves to an electrical signal on coil 19 which is coupled to amplifier 22, delayed in time relative to the input signal.

The operation of the circuit will now be explained in more detail.

In a quiescent state, permanent magnets 23 and 25 provide a flux field for biasing strips 11 and 13 to an initial condition of contraction or expansion. Strips 11 and 13 may be of a material having either positive or negative coefficients of magnetostriction; i.e., the strips may either expand or contract as a result of an increase in the strength of an applied flux field. Either type of material will be suitable; however, for purposes of explanation, it will be assumed that strips 11 and 13 will contract as a result of an increase in the applied flux field. Magnets 23 and 25 provide a flux field which can be considered to have lines of force which, as indicated by the arrows in FIG. 1 are in a direction from left to right in a portion of strip 11 between the two magnets, and from right to left in a portion of strip 13 between the magnets 23 and 25. Note that coil 19 is wound around both strips 11 and 13 in the same direction. An electrical pulse coupled from pulse generator 21 to coil 19 will cause coil 19 to develop a flux field which will have lines of force traversing both of the strips 11 and 13 in the same direction. Assume that the direction in which coil 19 is wound around strips 11 and 13, and the direction of the current pulse through coil 19 is such as to aid or reinforce the lines of force provided to strip 11 by magnets 23 and 25; concurrently, the field developed by coil 19 will oppose the lines of force provided to strip 13 by magnets 23 and 25. In other words, the flux field developed by coil 19 will reinforce or aid the bias flux field in strip 11, but will oppose the bias flux field in strip 13. Thus, in strip 11, a total flux field having relatively stronger lines of force will be developed; while, in strip 13, a total flux field having lines of force of relatively decreased strength will be provided. The increased field strength through strip 11 will cause an increased contraction of strip 11 while the decreased strength of the lines of force through strip 13 will cause a decreased contraction of strip 13. This interaction thus causes the periphery of delay line 15 to be subjected to a push-pull force thereby developing a torsional stress wave in delay line 15, as is known in the art.

Obviously, if the direction of the current pulse flowing through coil 19 is reversed, the strip 13 will have an increased contraction and strip 11 will have a decreased contraction. When the pulses provided to coil 19 are terminated, the strips will return to the initial condition to which they are biased by magnets 23 and 25.

When the transducer in FIG. 1 is connected at the output end of a delay line such as in a receiving transducer 10A of FIG. 2, the torsional stress wave being propagated through line 15 will be connected to the left hand end, as oriented in FIGS. 1 and 2, of strips 11 and 13. When the torsional stress wave arrives at the output weld, it is transformed into a longitudinal stress wave which in turn causes a change in the permeability mu of the magnetostrictive strips, thereby changing the field of the output coil 19 and inducing an output voltage which is coupled to amplifier 22 and thence to a utilization circuit, not shown. As is known, the delay of the output signal relative to the input signal is a function of the length of the delay line 15.

Figure 3:
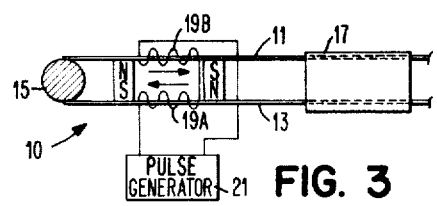
FIG. 3 is a second embodiment of the invention.

FIG. 3 shows a second embodiment of the invention. This structure of FIG. 3 is similar to that of FIG. 1 with the exception that instead of a single coil wound around the two strips 11 and 13, a first coil 19A wound on strip 11 is connected in series with a second coil 19B wound on strip 13. The operation of circuit of FIG. 3 is similar to that of FIG. 1. As noted above, care must be taken that each of the coils is positioned the same distance from the connection of the associated strip and the delay line 15 to assure the proper phase relation is effected to provide a push-pull stress on delay line 15, as is known in the art.

Figure 4:
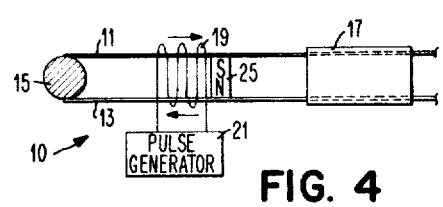
FIG. 4 is another embodiment of the invention.

FIG. 4 shows another embodiment of the invention. FIG. 4 is different from FIG. 1 in that only one magnet 25 is used in the circuit. A flux field provided by magnet 25 traverses strip 13, passes through the delay line 15 and back through strip 11 to the other side of permanent magnet 25, as indicated by the arrows. The operation of the circuit of FIG. 4 is similar to that of FIG. 1.

Figure 5:
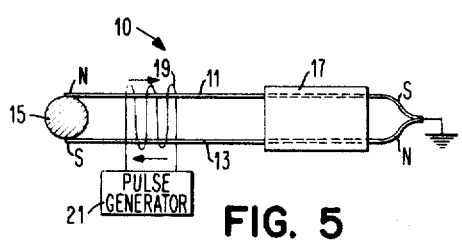
FIG. 5 is yet another embodiment of the invention.

FIG. 5 shows yet another embodiment of the invention in which the strips 11 and 13 are initially and permanently magnetized as by placing them in a strong magnetic field. This has proved practical with material containing iron in their compositions. The strips are connected with each other to provide a series flux loop, i.e., strips 11 and 13 may be connected with their poles as shown in FIG. 5. Since the strips 11 and 13 are effectively joined together through the delay line 15 on one end and directly by welding at the other end, a closed loop flux field is provided. The signal or alternating current field will increase the bias field in one permanently magnetized strip and will decrease the bias field in the other strip by the same amount; but, since a closed continuous loop is provided, the bias field will always return to its original bias point. As indicated above, the magnetic loss is therefore almost zero, and the flux field provided by the strips will be effective for a long period of time, similarly as though the strips were permanent magnets which, in effect, they are.

In the transducers in accordance with the invention, the principal path of lines of force of the bias flux field traverse a closed loop through the magnetostrictive strips. Since the principal path of flux field lines of force is not through the ambient air, the flux field is less affected by variations in temperature and humidity, and hence is relatively constant. A more constant energization can thus be coupled to the delay line to provide more uniform output signals.

It will be noted that in each of the embodiments shown, during each signal period, the signal or control fields aids the bias field in one strip and concurrently opposes the bias field in the other strip to thus provide improved transducer operation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electro-acoustical delay line including a wire for transmitting torsional stress waves and an input transducer, said transducer comprising:
 (a) a pair of elongated magnetostrictive strips respectively connected to spaced points on the periphery of the delay line wire and extending therefrom in spaced relation;
 (b) a pair of current carrying coils connected in series, each coil being mounted about a respective strip;
 (c) permanent magnets positioned between said strips in contact therewith to provide a biasing flux field having as its main circuit path portions of said strips;
 (d) said magnets being poled to cause the biasing flux field to be in a first direction through one of the strips and in a second direction through the other strip to thereby provide a flux field having a closed continuous loop;
 (e) said coils being selectively energizable to develop a control flux field which aids said biasing field in one of said strips and opposes said biasing field in the other strip to thereby induce a contraction in one strip and expansion in the other strip,
 (f) whereby a torsional stress wave is developed in the delay line wire.

2. An electro-acoustical delay line including a wire for transmitting torsional stress waves and an input transducer, said transducer comprising:
 (a) a pair of elongated magnetostrictive strips respectively connected to spaced points on the periphery of the delay line wire and extending therefrom in spaced relation;
 (b) a single current carrying coil wound around both of said strips;
 (c) a pair of permanent magnets positioned between said strips in contact therewith and in spaced position relative to one another for providing a biasing flux field having as its main circuit path portions of said strips;
 (d) said magnets being poled to cause the biasing flux field to be in a first direction through one of the strips and in a second direction through the other strip to thereby provide a flux field having a closed continuous loop;
 (e) said coil being selectively energizable to develop a control flux field which aids said biasing field in one of said strips and opposes said biasing field in the other strip to thereby induce a contraction in one strip and expansion in the other strip,
 (f) whereby a torsional stress wave is developed in the delay line wire.

References Cited by the Examiner

UNITED STATES PATENTS

| | | | |
|---|---|---|---|
| 2,526,229 | 10/50 | Hazeltine | 333—30 |
| 2,549,578 | 4/51 | Curtis | 333—30 |
| 2,552,139 | 5/51 | Bocciarelli | 333—30 |
| 2,565,469 | 8/51 | Brodburd | 333—30 |
| 2,736,881 | 2/56 | Booth | 333—30 |
| 2,810,888 | 10/57 | George | 333—71 |
| 3,011,136 | 11/61 | Scarrott | 333—30 |
| 3,020,416 | 2/62 | Van Vechten | 333—30 |
| 3,027,468 | 3/62 | Hill | 333—70 |
| 3,078,426 | 2/63 | Foundas | 333—30 |

HERMAN KARL SAALBACH, *Primary Examiner.*